Jan. 28, 1930.  G. R. LAWRENCE  1,745,020
INTAKE SYSTEM FOR INTERNAL COMBUSTION ENGINES
Filed June 8, 1927  3 Sheets-Sheet 1

Inventor:
George R. Lawrence

Patented Jan. 28, 1930

1,745,020

UNITED STATES PATENT OFFICE

GEORGE R. LAWRENCE, OF CHICAGO, ILLINOIS

INTAKE SYSTEM FOR INTERNAL-COMBUSTION ENGINES

Application filed June 8, 1927. Serial No. 197,407.

This invention has to do with the improvements in intake systems for internal combustion engines and the like. The invention has reference to an improved system for generating the explosive mixture and feeding the same to the engine cylinders and also has reference to the apparatus whereby the operation of said system is made feasible.

It is desirable to deliver to the cylinders a perfectly uniform quality of mixture, and it is also desirable to insure delivery of a uniform quantity of mixture to all of the different cylinders of the engine. The main object of the invention is to provide a system and apparatus which will accomplish this result.

Another feature of the invention relates to the provision of a system and apparatus whereby it is possible to secure the foregoing result without the necessity of heating the mixture as has been necessary according to previous practice. It is desirable to avoid the necessity of such heating because any such preheating necessarily results in an expansion of the gases so that the amount of combustible material which can be drawn into the cylinder with each charge is thereby reduced and the possible power of the engine is also thereby impaired.

One feature of the present invention relates to the provision of a system whereby the mixture is kept in rapid circulation at all times, and in fact is kept under such complete and vigorous circulation that its combustible and explosive qualities are maintained in the highest possible degree throughout substantially the entire mass of such mixture without the need of heating. In this manner it is possible to establish and maintain the mixture in the desired combustible and explosive quality and substantially without the necessity of heating, and therefore, the mixture can be delivered to the cylinders with a maximum amount of work available per cubic foot of the mixture delivered to the cylinders.

One feature of my invention relates to the provision of a circulating system which is mechanically established and maintained in rapid and vigorous circulation, sufficient in fact to accomplish the desired result. This circulating system is a closed or return circuit system so that the same mixture may be recirculated time after time and thus maintained in the same uniform quality and degree of combustibility. Means are provided for delivering mixture from this circulating system to the individual cylinders, and there is also an inlet connection whereby additional mixture, is automatically drawn into the system continuously and as needed in order to maintain the full amount of circulation and compensate for the withdrawal of mixture from the circulating system into the cylinders.

The system is also so established that the same uniform quality of mixture both as to amount and composition is always available to all of the cylinders of the engine, thereby insuring a perfectly uniform and regular delivery of power by all of the cylinders at all times.

Means are also provided for controlling the delivery of mixture from this circulating system into the cylinders. This arrangement is so established that the throttling of the delivery connections to the cylinders will not interfere with the proper functioning of the circulating and mixture forming apparatus. Means are also provided for controlling the delivery of new raw fuel into the system in such a manner that the correct mixture will be maintained at all times. More particularly this controlling means is under the influence of the connection through which the unconsumed portion of the circulating mixture is returned to the primary portion of the system, thereby automatically co-relating the parts in the proper manner.

Another feature of the invention relates to the provision for an arrangement by which it is possible to successfully use relatively large passages for the mixture so that the velocity of the gases therein is greatly reduced and the resistance to the flow of said gases is also reduced. These passages are of such relatively large size that the quality and amount of mixture delivered to the different cylinders will be uniform notwithstanding the fact that the resistance to the flow of gases to the different cylinders may not be identically the same. Nevertheless it is a feature of the invention that the passages to the different cylinders are all of substantially the same resistance to the flow of mixture (as determined by the shape and lengths of said passages).

A further feature of the invention relates to the provision of an arrangement whereby the mixture is delivered to the cylinders under a slight plenum as distinguished from the usual suction or vacuum which exists in the intake manifolds of previous types of engine. By this means the volumetric efficiency of the arrangement is improved and the operation of the system as a whole is also improved.

A further feature of the invention is to provide an arrangement such that there is no loss at low throttle as the gas speed of the circulating system is substantially constant.

A further feature relates to the provision of an arrangement such that there is always available a supply of perfect mixture in considerable volume, the same being immediately available for prompt delivery to the cylinders upon increase of the throttle opening. In this way the tendency to choke or starve when the throttle is suddenly opened is greatly reduced.

Due to all of the foregoing I have provided an arrangement whereby a practically perfect mixture is available at all speeds and at all ordinary working temperatures, with freedom from deposit of carbon, fouled plugs (except such as may be due to overoiling), and burned and overheated valves are eliminated. Furthermore, due to the provision of an improved mixture the heat loss is reduced since the mixture is much faster burning, the mean effective pressure is increased at a given volume of charge, it is possible to use a cooler mixture, and lower grade fuels may be used. It is also possible to secure increased scavaging at full throttle opening due to higher ratio of new to old gas; and it is also possible to secure better fuel economy.

A further feature of the invention relates to the provision of an arrangement such that dirt and other impurities are eliminated from the intake mixture by a centrifugal action.

Still more specifically the system comprises a suitable air circulator such as a rotary or centrifugal blower adapted to deliver mixture to the different cylinder inlet ports individually, all of said connections generally being of substantially the same resistance to the flow of the mixture (as determined by the shapes and lengths of said passages), so as to insure the delivery of the same quality of mixture to all of the cylinders individually. There is a throttle valve located substantially at the position of each inlet port. All of said throttle valves are located in the individual connections already referred to; and all of said valves are controllable by a common operating member.

There is also provided a common return connection from all of said passages. The same is connected to each passage at a point immediately in advance of the valve therein. This common return connection is for the return of unconsumed mixture back to the inlet side of the circulating device so that the unconsumed portion of the mixture is again taken into the blower and recirculated, and maintained at high velocity.

Means are provided for driving the blower at a substantially constant speed so that it generates a substantially constant difference of pressure between its inlet and delivery sides. This blower therefore tends to maintain a constant rate of circulation, the unconsumed portion of the mixture being returned to the blower and recirculated.

There is also provided an inlet connection to the inlet side of the blower for the supply of fresh quantities of air thereto in such amount as is necessary to maintain the total amount within the system substantially constant. There is also provided means for automatically delivering a fresh supply of the liquid fuel into the mixture in the correct quantities necessary to maintain the entire system at the proper proportions of its constituents.

Other objects of the invention are to provide a very simple construction of apparatus, one which can be readily adapted to present types of internal combustion engine construction, one which will be highly effective and satisfactory in its operation, and one which will in many other ways constitute a substantial advance over present systems of delivery of mixture to internal combustion engines.

Other objects and uses of the invention will appear from a detailed description of the same which consists in the features of construction and combinations of parts hereinafter described and claimed.

Figure 1:
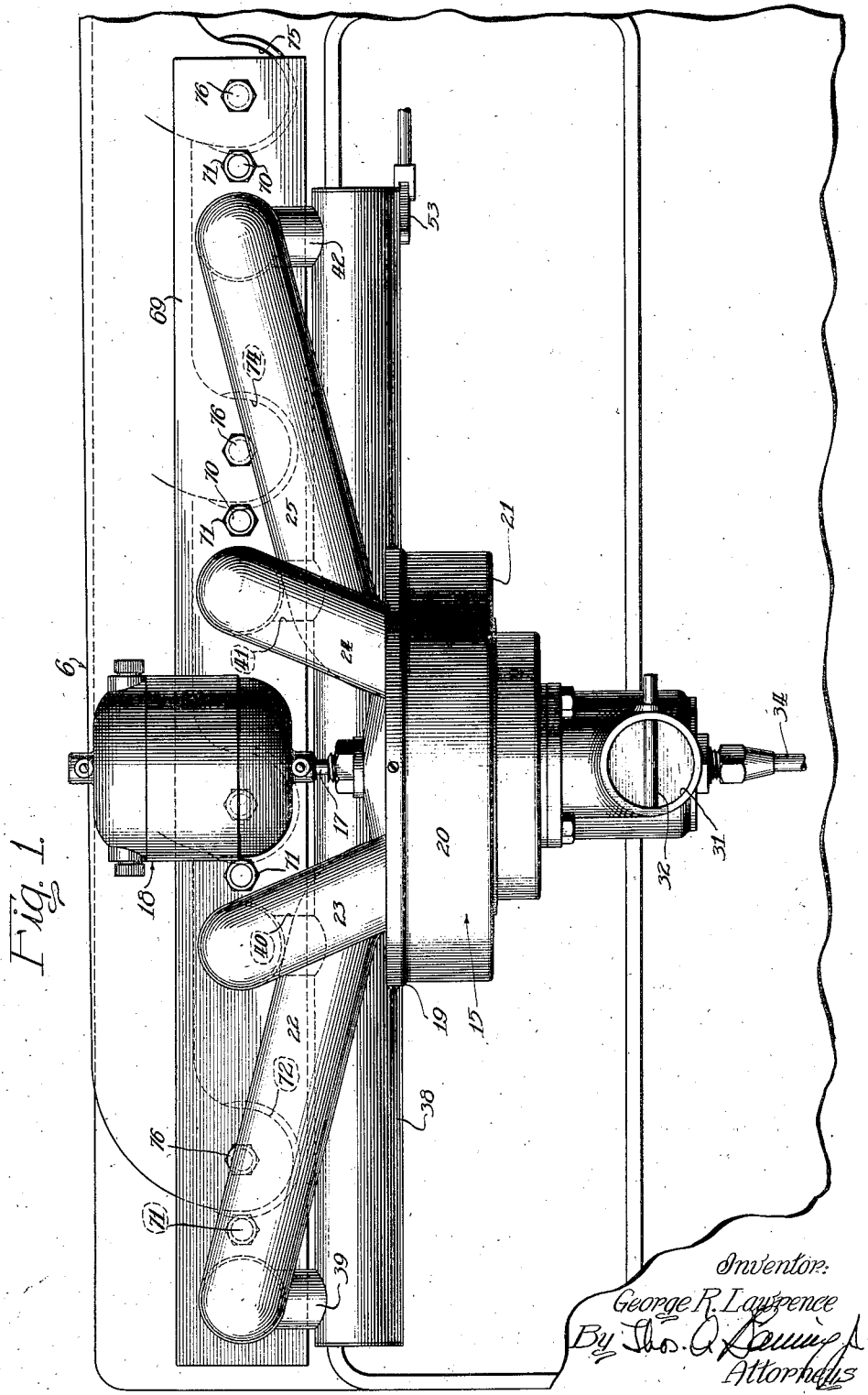
Fig. 1 shows a side elevation of an engine having attached thereto a mixture supply system embodying the features of the present invention.

Referring now to the drawings the engine is designated in its entirety by the numeral 6. I have chosen to illustrate the features of my present invention as being incorporated within a four cylinder machine, but manifestly they may be applied to equal advantage to machines having a greater or smaller number of cylinders. The intake chambers for the four cylinders are designated by the numerals 7, 8, 9 and 10; and the exhaust chambers by the numerals 11, 12, 13 and 14 respectively. Suitable valve arrangements are used, and the present invention does not concern itself with the construction of these parts. I provide a mixture circulator 15 at a point conveniently accessible to all the inlet chambers 7, 8, 9 and 10. This mixture circulator preferably takes the form of a rotary blower having a runner 16 which is mounted on the lower end of the drive shaft 17. This drive shaft is driven in any convenient manner as by means of a small electric motor 18 placed above the position of the circulator 15. Such motor may of course be supplied with current from any convenient source such as the storage battery of the vehicle or in some cases other forms of drive may be used in place of the motor. Preferably, however, the runner 16 is driven at substantially constant speed.

The runner 16 rotates within a circular housing having the roof 18, the edge of which sets down to a shoulder 19 at the upper edge of the flange 20 of the lower housing section 21 and is held in place by screws. This roof 18 is conveniently dished as illustrated, so as to establish a somewhat increased clearance of the chamber immediately above the runner.

Figure 2:
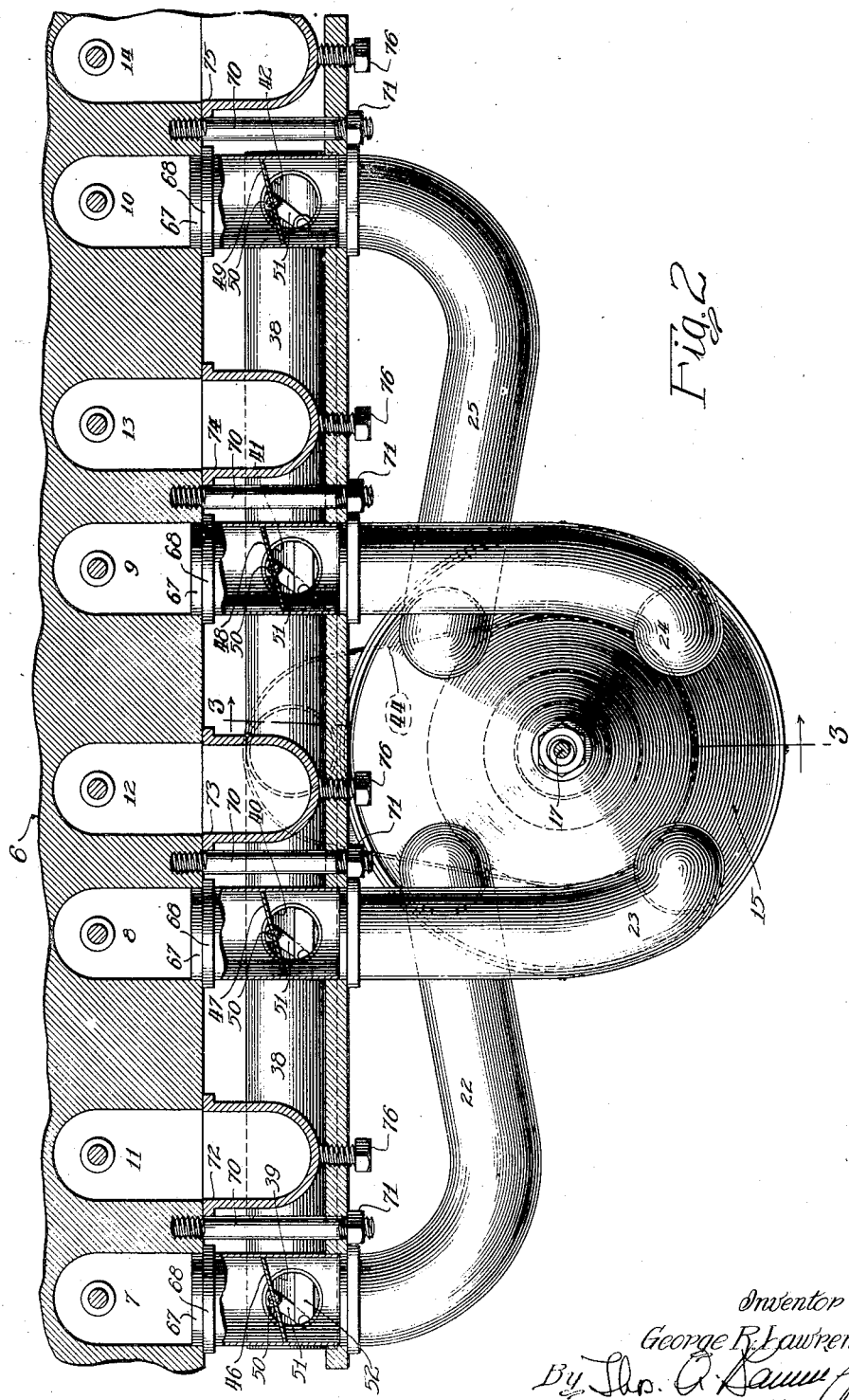
Fig. 2 shows a plan view corresponding to Fig. 1, portions of the inlet pipes being sectionalized and the section also being carried throughout inlet and exhaust chambers of the engine and through the exhaust passages.

Into the roof 18 of the circulator 15 there are connected the flues 22, 23, 24 and 25 corresponding to the inlet chambers 7, 8, 9 and 10, respectively. These flues are connected into the circulator in symmetrical positions, and in such a manner that the resistances of the different flues to the flow of mixture from the circulator to the respective inlet chambers are of approximately the same amount. Thus, examination of Fig. 2 in particular shows that all of the flues are of substantially the same length, and comparison of the different figures shows that the flues are all provided with bends and deflections of such shape and abruptness that, combined with their respective lengths, they all have substantially equal resistance to the flow of mixture. For the above reasons all of the cylinders will receive equal charges for a given throttle opening, and as a result the different cylinders will all perform the same amount of work.

Due to the increased and constant air speed in the system, established by the blower, the fuel is kept in suspension in the air without the necessity of reducing the size of the passage, with corresponding increase in the resistance of the passages; and therefore the fuel is kept in suspension in the air without increasing the resistance of the passages. Furthermore, this increased size of the passage makes available a greater volume of ready mixture, available for instant supply to the cylinders upon demand.

Inasmuch as the flues are connected into the blower housing at regular equal intervals about its center, it is impossible for the mixture delivered to the various cylinders to vary in richness between one cylinder and another.

Figure 4:
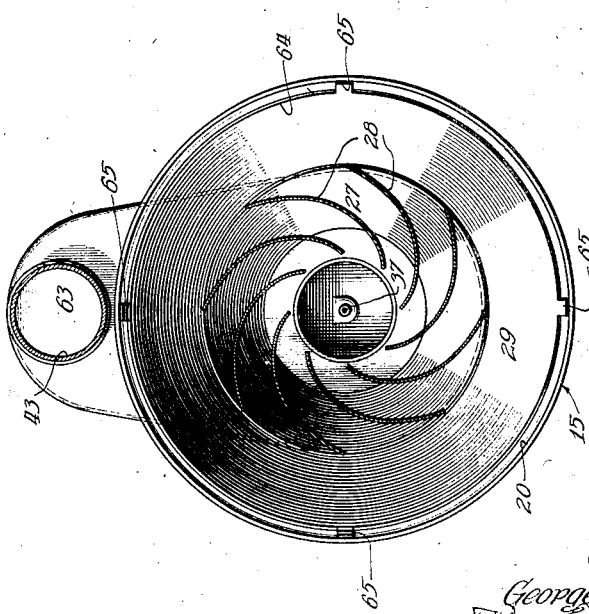
Fig. 4 shows a horizontal section on the line 4—4 of Fig. 3, looking in the direction of the arrows.

The runner is of any convenient design, but the form illustrated includes the top and bottom plates 26 and 27, together with the vanes 28 extending between them; said vanes curving from the center towards the periphery. It is desirable to use a type of runner which will give a relatively high delivery pressure for a given peripheral speed, and such a result is accomplished by the use of a runner having trailing vanes as illustrated in Fig. 4.

A cup shaped deflector 29 is set down into the housing 20 of the circulator, said deflector serving to throw the delivered mixture up towards the roof 18, and also serving to contract the vertical size of the runner more or less in proportion to the increase of diameter. The bottom plate 27 of the runner is similarly cupped and travels close to the deflector plate 29, this arrangement insuring a more perfect delivery of the mixture under a relatively high pressure for a given peripheral speed.

The bottom plate 29 of the runner is axially perforated to register with an inlet sleeve 30 which reaches down from the bottom 21 of the circulator housing and communicates with the supply throat 31. The fresh air supply is drawn in through this throat usually without preheating. If desired a choke valve 32 of the usual form will be placed in the throat 31 simply for the purpose of assisting the starting operations with a cold motor.

A float chamber 33 of any convenient design is located adjacent to the inlet side of the device, said float chamber receiving its supply of fuel through the pipe 34. A passage 35 delivers fuel from the float chamber to the lower end of the tube 36 which reaches up towards the center of the inlet opening of the runner and terminates in a nozzle 37 at a point close to the center of the sleeve 30. Due to the rush of gases past said nozzle 37 and into the runner, there will be produced an aspirating effect which will reduce the pressure at this point so that the fuel will rise through the tube 36 and mix with the gases circulating past the nozzle.

The valve 59, presently to be explained, closes inversely in proportion to the volume of mixture which is taken back to the inlet side of the blower and recirculated. The nozzle 37 is located at the inlet side of the blower where a constant volume of mixture and air is being drawn in at a uniform rate. Consequently the aspirating effect is constant and therefore the aforesaid control of the valve 59 will serve to insure supply of a mixture of constant richness to the blower.

Figure 3:
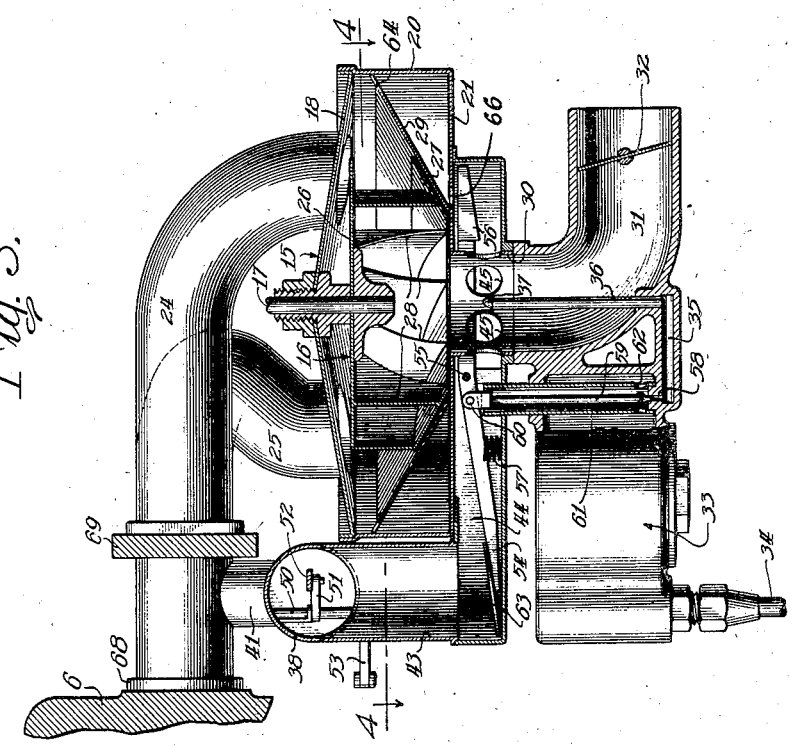
Fig. 3 shows a vertical section substantially on the line 3—3 of Fig. 2 looking in the direction of the arrows, the float chamber being shown in elevation.

There is a return manifold 38 which extends along the device and adjacent to the delivery ends of all of the flues 22, 23, 24, 25 (preferably lying below said flues as indicated in the drawings). This manifold is connected to the delivering ends of the different flues by the downcomers 39, 40, 41 and 42 respectively; and the center of the manifold 38 is in turn provided with a common return connection 43 which leads down and communicates with a return passage 44 (see Fig. 3). This return passage reaches out far enough to encircle the sleeve 30 as best shown in Fig. 3, which sleeve is in turn provided with a series of openings 45 through which the returning mixture is allowed to flow from the passage 44 to the interior of the sleeve 30 and thence again to the runner.

In the delivery ends of the flues 22, 23, 24, and 25, there are placed the individual throttles 46, 47, 48 and 49 for the individual cylinders, said throttles being located in their respective flues at positions beyond the downcomers 39, 40, 41 and 42. As a matter of convenience all of these throttles are mounted upon stems 50 which reach down through the downcomers and are provided with cranks 51 on their lower ends. All of these cranks are in turn connected to a common link 52 reaching through the length of the manifold, 38, and one of the stems 50 (conveniently the end one) is carried clear through the manifold 38 and provided with a crank 53 by means of which it can be rocked. Thus the entire series of throttle valves is simultaneously controlled.

It will further be noted that by means of this design it is possible to secure complete throttling of all of the flues by means of connections which are entirely enclosed with the exception of the common control connection which must necessarily be established. It will be further noted that as the flues are throttled, the mixture flowing through the respective flues is diverted downwardly to a greater or less extent and returned to the inlet side of the circulator and thereby recirculated.

It is intended that the supply throat 31 should remain fully opened during the normal running of the machine. Furthermore it is intended that the circulator runner should be driven at substantially constant speed under which condition it will always handle substantially a constant volume of mixture per minute. Therefore as the throttles 46, 47, 48 and 49 are opened and closed, a less or greater amount of unconsumed mixture will be continuously returned to the circulator, and the demands for fresh air to be delivered through the supply throat will correspondingly fluctuate to such an extent as to continuously make up for the amount of air taken into the cylinders. When the throttles are substantially fully closed into the idling position practically the full volume of the mixture will be returned to the circulator and recirculated, at which time a minimum amount of fresh air will be drawn in through the supply throat; whereas when operating with wide open throttle at high speed practically all of the mixture will be drawn into the cylinders and very little will be returned so that the full amount of air will be drawn in through the supply throat.

It will be also noted that due to the presence of the manifold 38, together with the various downcomers and connections thereto, as well as the presence of the various flues and the volume of the circulator itself, there is always ready and available for immediate delivery to the cylinders a very substantial volume of mixture fully prepared and in perfect condition. A portion of this mixture is available directly from the flues 22, 23, 24 and 25, and a portion of it will be available to be drawn backwards from the manifold 38 and connections thereof in case of sudden demand. Thus for example if the throttles are suddenly opened there will be a supply of mixture available for instant delivery to the cylinders, thereby avoiding starvation or killing of the engine functions such as sometimes occurs with a sudden opening of the throttle with other forms of supply.

It will be noted that the aspirating effect at the fuel nozzle 37, is somewhat constant due to the fact that the volume of gases passing said nozzle into the runner remains practically constant. In order to regulate the delivery of fresh fuel through said nozzle any suitable form of device may be used. Thus for example in Fig. 3, I have illustrated an automatically controlled needle valve arrangement which operates under the influence of the volume of mixture being recirculated. This arrangement includes a light arm 54 located within the return passage 44 and pivoted at the point 55, said arm preferably reaching around the sleeve 30 and provided with a counterweight 56 at the back side thereof. This will prevent variations of mixture due to vibrations from any causes such as road shocks. A spring 57 normally raises the arm 54.

Intermediate between the float chamber 33 and the fuel passage 35 is a needle valve port 58, and a needle valve 59 for controlling said port, reaches up and is pivoted to the arm 54 at the point 60. A tube 61 surrounds the needle 59 and reaches up into the return passage 44 far enough so that the liquid fuel cannot run up and spill out of the upper end of said tube 61. This tube is provided at its lower end with a series of openings 62 through which the fuel enters the tube and thus finds its way to the needle valve.

On the end of the arm 54 there is a plate 63 which stands in alignment with the return connection 43. Therefore the recirculating mixture returning by the connection 43 into the passage 44 blows past the plate 63 and forces the same down to a greater or less extent depending upon the volume of mixture which is being returned. The greater this returning volume, the more the arm 54 will be forced down, and likewise the needle valve will be closed to a greater extent. It is thus evident that the opening and closing of the needle valve 58—59 is in inverse ratio to the volume of re-circulating mixture and is therefore in direct ratio to the volume of mixture being taken into the cylinders. Furthermore, the resistance of the return circuit does not reduce the volume of mixture available at the cylinder ports.

For any given setting of the needle valve 59 (produced by depression of the valve plate 63) the amount of fuel leaving the nozzle 37 will be constant because the total flow of gases past the nozzle is constant. This total flow comprises the volume of return flow plus the new air entering through the throat 31. Therefore, as long as the amount of new air entering (being the amount taken into the cylinders) remains constant the rate of fuel delivery will also remain constant. As the volume of returning gas changes, either to increase or decrease, the volume of new air also changes in complementary amount; and the needle valve 59 (being operated by the volume of returning gas) will also be simultaneously readjusted so that the rate of fuel delivery will always be exactly in proportion to the volume of new air taken in; and thus the mixture will always be of constant richness.

The needle valve control damper is operated by the overflow of the unused portion of mixture in the circulating system and therefore its operation does not result in a reduction of volumetric efficiency as is the case in standard practice where control is had by means of a resistance in the intake of the carburetor or at any point in the system.

The deflector plate 29 in the circulator housing preferably has its outer edge 64 separated slightly from the encircling wall of the housing 20, but centrally spaced within said housing by a series of ears 65 (see Fig. 4). As a consequence there is established a relatively narrow annular passage around the upper edge of the deflector plate, and any relatively heavy particles of unvaporized fuel or dust will be thrown out by centrifugal force against the wall of the housing 20 and will find their way down past the edge 64 of the deflector plate and into the space beneath said plate. Any such unvaporized liquid fuel will then find its way back to the circulating body through any convenient opening, as for example, a small port 66 in the floor 21 of the housing 20, which port communicates with the return passage 44; or the lower edge of the plate 29 may be left slightly above the floor 21.

Manifestly, there are numerous details of construction which do not need to be particularly enlarged upon, such for example as the means whereby the flues 22, 23, 24 and 25 are connected to the cylinder block, etc. In the particular construction illustrated in the drawings each of said flues has at its inner end a nipple 67 (see Fig. 2), immediately behind which is a narrow flange 68, and the nipples reach slightly into the intake chambers 7, 8, 9 and 10 respectively. There is also provided a retainer bar 69 which is drawn to the cylinder block by a series of rods 70 and retainer nuts 71, said retainer bar serving to hold the exhaust gas connections, 72, 73, 74 and 75 in position against the respective exhaust chambers 11, 12, 13 and 14 as by means of the set screws 76.

While I have herein shown and described only a single embodiment of the features of my present invention still I do not intend to limit myself thereto except as I may do so in the claims.

I claim:

1. The combination with an internal combustion engine having a plurality of inlet mixture chambers, of a rotary blower having a vertical shaft, means for driving same at substantially constant speed, an axial inlet connection at the bottom of the blower, a supply throat leading thereinto, a plurality of symmetrically placed flues at the top of the blower corresponding to the various inlet chambers, all said flues having substantially the same resistance to the flow of mixture delivered from the blower to the respective inlet chambers, a return manifold adjacent to all of the flues, individual downcomers from all of the flues to said manifolds, individual throttle valves in the flues, at positions beyond the downcomers, common operating means for all of said throttle valves, a central common return connection from said manifold, a return passage from said common return connection leading to the axial inlet connection to the blower, a float chamber, a spray nozzle terminating within the inlet connection to the blower, a needle valve for controlling delivery of fuel from the float chamber to said spray nozzle, a valve plate adjacent to the delivery end of the common return connection, spring means tending to move the same into closing position adjacent to the return connection, and an operating connection between said valve plate and the needle valve, substantially as described.

2. The combination with an internal combustion engine having a plurality of inlet mixture chambers, of a blower, means for driving the same at substantially constant speed, an inlet connection to the blower, a supply throat leading thereinto, a plurality of symmetrically placed flues at the top of the blower corresponding to the various inlet chambers, all of said flues having substantially the same resistance to the flow of mixture delivered from the blower to the respective inlet chambers, a return manifold adjacent to all of the flues, individual downcomers from all of the flues to said manifold, individual throttle valves in the flues at positions beyond the downcomers, common operating means for all of said throttle valves, a central common return connection from said manifold, a return passage from said common return connection leading to the axial inlet connection to the blower, and means for supplying raw fuel to the inlet connection to the blower, substantially as described.

3. The combination with an internal combustion engine having a plurality of inlet mixture chambers, of a blower, means for driving same, an inlet connection to the blower, a plurality of symmetrically placed flues leading from the blower and corresponding to the various inlet chambers, a return manifold adjacent to all of the flues, individual connections from all of the flues to said manifold, individual throttle valves in the flues at positions beyond the connections aforesaid, common operating means for all of said throttle valves, a central common return connection from said manifold, a return passage from said common return connection leading to the inlet side of the blower, means for supplying raw material to the inlet side of the blower, and means for controlling the supply of raw fuel inversely according to the volume of mixture returning from the manifold to the blower, substantially as described.

4. The combination with an internal combustion engine having a plurality of inlet mixture chambers, of a blower, means for driving same, an inlet connection to the blower, a series of flues leading from the blower corresponding in number to the inlet mixture chambers of the engine, individual throttle valves in said flues, common means for controlling all of said throttle valves, return connections from all of the flues at points intermediate between the blower and the throttle valves, to the inlet side of the blower, and means for delivering raw fuel to the inlet side of the blower inversely according to the volume of mixture returning thereto, substantially as described.

5. The combination with an internal combustion engine having a plurality of inlet mixture chambers, of a blower, means for driving same, an inlet connection to the blower, a series of flues leading from the blower corresponding in number, to the inlet mixture chambers of the engine, individual throttle valves in said flues, common means for controlling all of said throttle valves, return connections from all of the flues at points intermediate between the blower and the throttle valves, to the inlet side of the blower, and means for delivering raw fuel to the inlet side of the blower, substantially as described.

6. The combination with an internal combustion engine having a series of inlet valves, of a blower, an inlet connection thereto, a series of individual flues leading from said blower to the several valves of the engine, individual throttles in said flues, and return connections from the flues at positions intermediate between the blower and the inlet valves, to the inlet side of the blower, substantially as described.

7. The combination with an internal combustion engine having a plurality of inlet valves, of a rotary blower, means for driving the same at substantially constant speed, an inlet connection to the blower, a series of flues leading from the blower equal in number to the engine inlet valves, individual throttles in said connections, and means for returning to the inlet side of the blower the unconsumed portion of the mixture delivered by the blower, substantially as described.

8. The combination with an internal combustion engine having a plurality of inlet mixture connections, of a rotary blower, an inlet connection thereto, a return circuit from the delivery side of the blower to said blower inlet connection, a series of individual connections from said circuit for the individual supply of mixture to the different engine inlet valves, and a control means in said individual connections, substantially as described.

9. The combination with an internal combustion engine having a series of inlet valves, of a rotary blower, an inlet connection thereto, a return circuit reaching from the delivery side of said blower to the inlet connection thereto, and a series of individual connections from said circuit for the supply of mixture to the individual engine inlet valves, substantially as described.

10. The combination with an internal combustion engine having a plurality of inlet valves, of a rotary blower, an inlet connection thereto, a return circuit from the delivery side of said blower to the inlet connection, means for delivering mixture from said return circuit to the engine inlet valves, means for supplying raw fuel to the inlet side of the blower and means for controlling the amount of such raw fuel supply inversely according to the volume of mixture returning to the blower, substantially as described.

GEORGE R. LAWRENCE.